US010366592B2

(12) United States Patent
Gillum et al.

(10) Patent No.: US 10,366,592 B2
(45) Date of Patent: Jul. 30, 2019

(54) BEACON DETECTION SYSTEM FOR LOCATING MISSING PERSONS

(71) Applicant: Vector Flight LLC, San Francisco, CA (US)

(72) Inventors: Eliot Gillum, San Francisco, CA (US); Kevin Ho Wing Lau, San Jose, CA (US)

(73) Assignee: Vector Flight LLC, San Francisco, CA (US)

( * ) Notice: Subject to any disclaimer, the term of this patent is extended or adjusted under 35 U.S.C. 154(b) by 0 days.

(21) Appl. No.: 15/709,026

(22) Filed: Sep. 19, 2017

(65) Prior Publication Data

US 2018/0082560 A1    Mar. 22, 2018

Related U.S. Application Data

(60) Provisional application No. 62/396,489, filed on Sep. 19, 2016.

(51) Int. Cl.
*G08B 21/02*     (2006.01)
*B64C 39/02*     (2006.01)
(Continued)

(52) U.S. Cl.
CPC ........ *G08B 21/0272* (2013.01); *B64C 39/024* (2013.01); *G01S 5/0036* (2013.01);
(Continued)

(58) Field of Classification Search
CPC .......................... G08B 21/0272; G01S 5/0231
(Continued)

(56) References Cited

U.S. PATENT DOCUMENTS 7,355,513 B1    4/2008  Brockel et al.
8,380,162 B2 *  2/2013  Matsuo ............... H04L 12/1895
                                                    455/404.2
(Continued)

FOREIGN PATENT DOCUMENTS

KR    20160113841 A    10/2016
WO    WO2014205242 A1  12/2014
WO    WO2016142967 A1   9/2016

OTHER PUBLICATIONS

International Search Report and the Written Opinion dated Jan. 3, 2018, in International Application No. PCT/US2017/052283 filed Sep. 19, 2017.

(Continued)

*Primary Examiner* — Vernal U Brown
(74) *Attorney, Agent, or Firm* — Vierra Magen Marcus LLP

(57) ABSTRACT

A beacon detection system which can locate a missing search subject includes: a beacon signal receiver; a location position detector; and a beacon detector. The detector is configured to detect a location of a broadcasting beacon signal associated with a personal device of a search subject within search data covering a geographic search area derived from a search for the search subject, the search data gathered by the beacon signal receiver and location position detector. A computer implemented method of determining a location of a search subject is also provided. The method determines at least a possible connection request from Wi-Fi signals in search data gathered by a Wi-Fi radio covering a geographic search area for a search subject and associated location information to locate the search subject.

4 Claims, 10 Drawing Sheets

(51) Int. Cl.
*G01S 5/02* (2010.01)
*G01S 19/17* (2010.01)
*G01S 19/51* (2010.01)
*G01S 5/00* (2006.01)

(52) U.S. Cl.
CPC .............. *G01S 5/0081* (2013.01); *G01S 5/02* (2013.01); *G01S 5/0231* (2013.01); *G01S 19/17* (2013.01); *G01S 19/51* (2013.01); *G08B 21/0275* (2013.01)

(58) Field of Classification Search
USPC ........................................................ 340/8.1
See application file for complete search history.

(56) References Cited

U.S. PATENT DOCUMENTS

| 9,094,816 | B2* | 7/2015 | Maier | ................... | H04W 4/025 |
| 2003/0052823 | A1 | 3/2003 | Carroll | | |
| 2005/0113090 | A1* | 5/2005 | Sharony | ................ | G01S 5/0252 |
| | | | | | 455/436 |
| 2007/0256135 | A1* | 11/2007 | Doradla | ................ | H04L 63/101 |
| | | | | | 726/26 |
| 2008/0248813 | A1* | 10/2008 | Chatterjee | ................ | G01S 1/68 |
| | | | | | 455/456.2 |
| 2008/0261556 | A1 | 10/2008 | McLellan | | |
| 2013/0281120 | A1* | 10/2013 | Oka | ...................... | H04W 64/00 |
| | | | | | 455/456.2 |
| 2016/0236638 | A1* | 8/2016 | Lavie | ..................... | H04N 7/185 |
| 2016/0360562 | A1* | 12/2016 | Chong | ................. | H04W 4/025 |

OTHER PUBLICATIONS

Wang et al., "Feasibility Study of Mobile Phone WiFi Detection in Aerial Search and Rescue Operations", proceedings of the 4th asia-pacific Workshop on systems, apsys '13, Jan. 1, 2013, pp. 1-6, xp055432806, New York, USA.

* cited by examiner

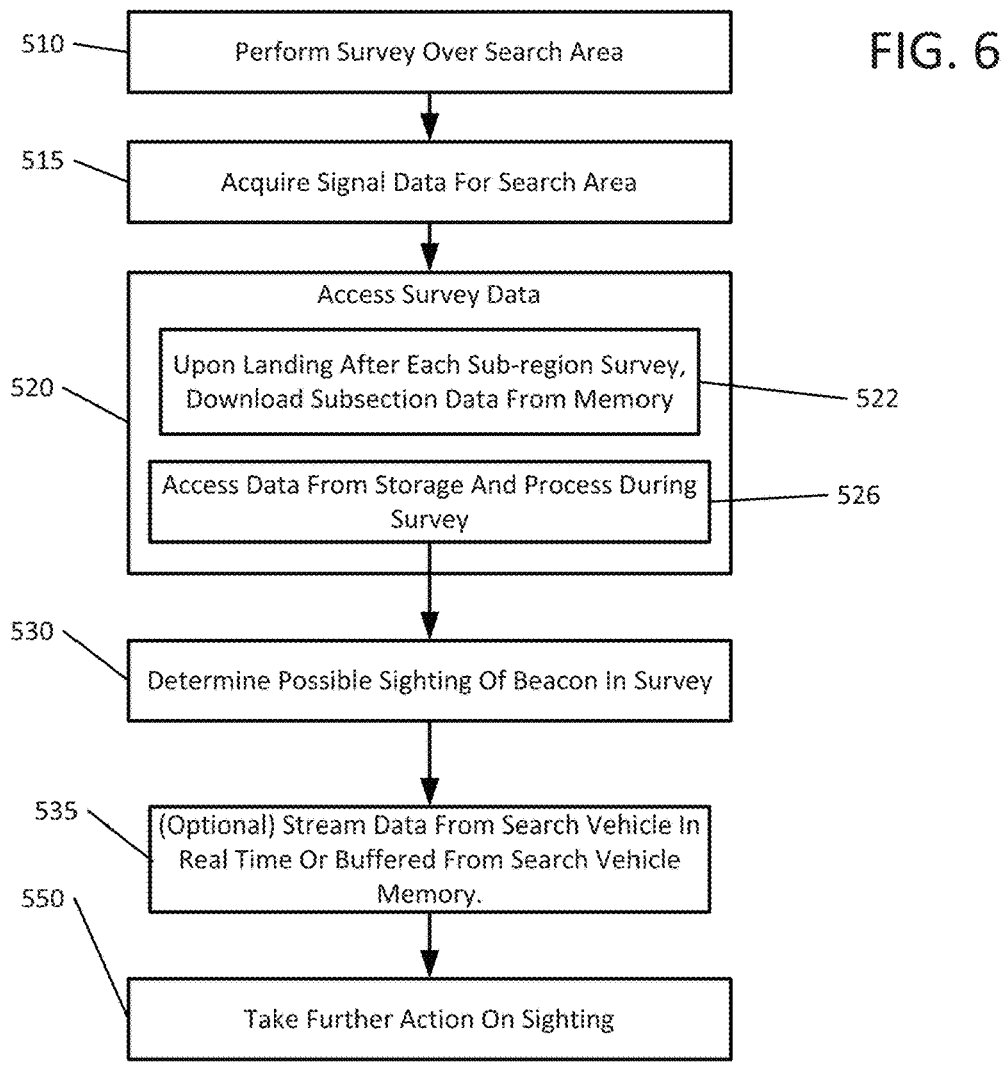
FIG. 6
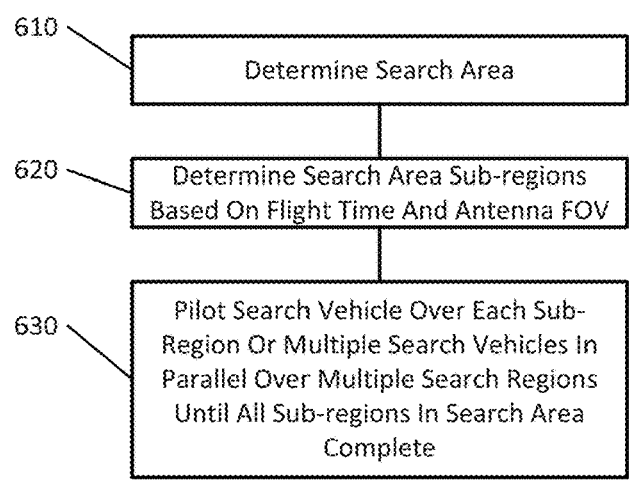
FIG. 7 (510)

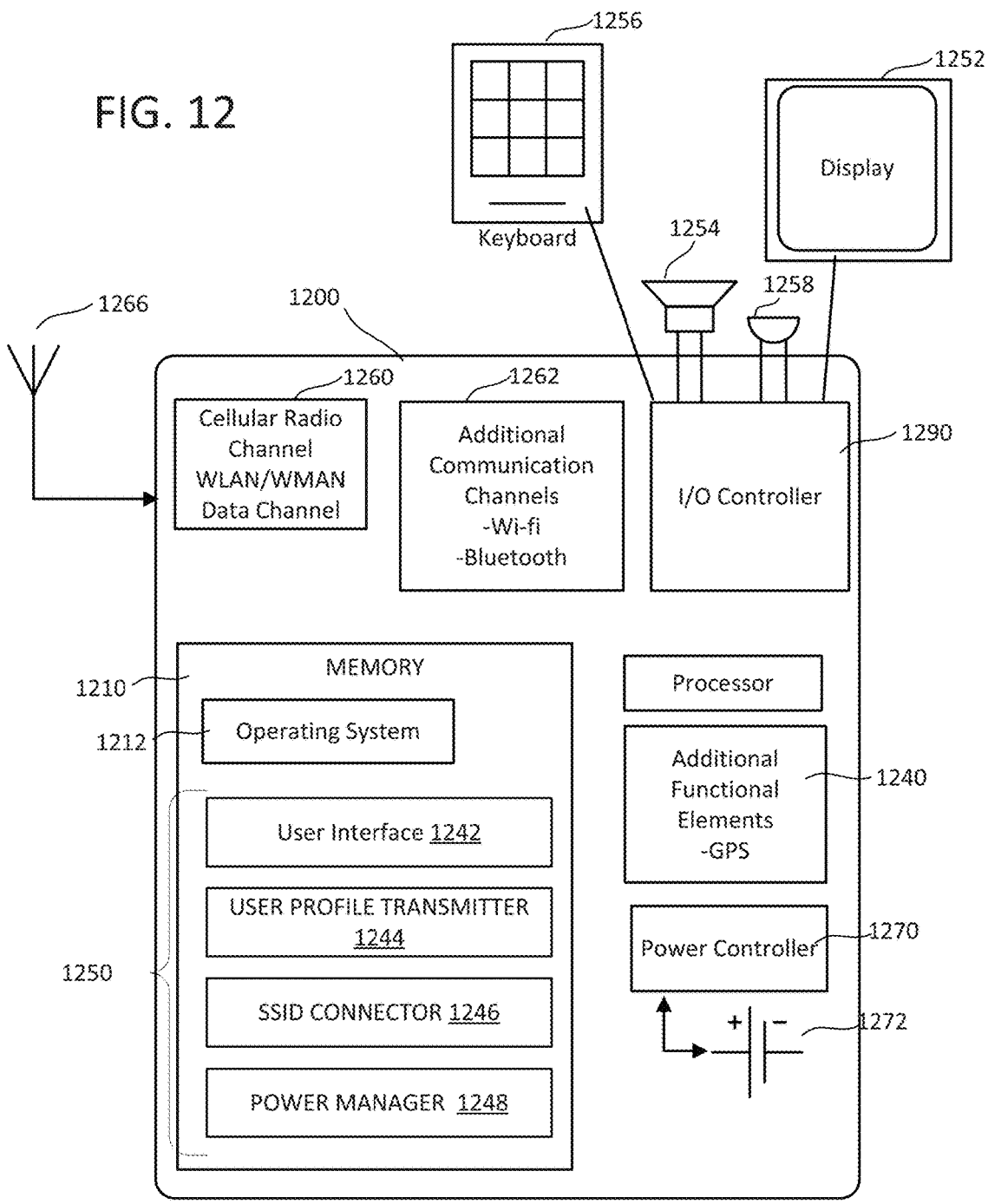

BEACON DETECTION SYSTEM FOR LOCATING MISSING PERSONS

BACKGROUND

When people become lost in wilderness areas, rescue workers and emergency responders are often tasked with searching an area of difficult terrain, and possibly unfamiliar surroundings. Often, search vehicles such as helicopters, airplanes, and off-road motor vehicles may be utilized to cover more search area than would be possible by humans searching on foot. With the development of unmanned aerial vehicles (UAVs), commonly referred to as "drones", additional resources can be applied to rescue efforts for lost individuals. One difficulty when searching on foot, or when using both manned and unmanned vehicles, is they generally depend on a visual sighting of the missing party.

SUMMARY

The Technology, briefly described comprises a beacon detection system configured to locate a missing search subject. The system includes: a beacon signal receiver; a location position detector; and a beacon detector configured to detect a location of a broadcasting beacon signal associated with a personal device of a search subject within search data covering a geographic search area derived from a search for the search subject, the search data gathered by the beacon signal receiver and location position detector.

A further aspect includes a search system configured to operate on a search vehicle, including: a Wi-Fi radio capable of broadcasting one or more SSIDs and receiving connection requests for the one or more SSIDs; a location position detector; and a beacon detector responsive to the signal receiver, the beacon detector configured to detect at least a location of a Wi-Fi connection attempt to the one or more SSIDs within search data covering a geographic search area derived from a search for a search subject and gathered by the Wi-Fi radio and location position detector, the connection attempt made by a mobile device associated with the search subject. Other embodiments of this aspect include corresponding computer systems, apparatus, and computer programs recorded on one or more computer storage devices, each configured to perform the actions of the methods.

In another aspect, a computer implemented method of determining a location of a search subject is provided. The method includes: accessing search data including beacon signals and associated geographic location coordinates resulting from a covering a geographic search area for a search subject which is gathered by a Wi-Fi radio capable of broadcasting one or more SSIDs and receiving connection requests for the one or more SSIDs and a location position detector; determining at least a possible connection request from the beacon signals, the connection request associated with a mobile device associated with a search subject; and filtering the data to determine whether the connection request is from the mobile device associated with the search subject; and outputting search information to a search agent, the search information including a location of at least the connection request

BRIEF DESCRIPTION OF THE DRAWINGS

FIG. 6 depicts a flowchart illustrating a first embodiment of a method for detecting beacons in a search area. In accordance with the present technology.

FIG. 7 illustrates a method of performing a survey over a defined area.

FIG. 12 illustrates a mobile device incorporating a search identifier application therein.

DETAILED DESCRIPTION

The technology described herein provides a beacon detection system allowing searchers to more reliably and efficiently search for people associated with the beacon. This detection is useful in search and rescue operations especially in terrain that is difficult to access or see through. In the context of this application, a beacon is any detectable wireless signal which can be generated from any number of different sources. In the context of this application, a beacon will be described with respect to a wireless signal from a personal mobile device, such as a Wi-Fi enabled cellular device, and a radio frequency (RF) signal such as that which may be generated by a mobile device, or a such as that which may be generated by a specific RFID tag or another single-purpose hardware device.

In accordance with the technology, the beacon detection system may be mounted on any type of vehicle, including but not limited to a human being, all-terrain motor vehicle, a manned aircraft and an unmanned aircraft (UAV). The vehicle carrying the detection system is caused to search a specific search area, or a sub region of the search area, in order to search for and detect beacons which can then lead rescue workers to the missing individual(s). The technology provides for a beacon detection system, which may be integrated into or mounted as a retrofit to a UAV or any other search vehicle or person. It should be recognized that the beacon detection system in accordance with the present technology may not be utilized solely with a UAV, the can likewise be utilized with a manned aerial vehicle, or a ground vehicle, or any number of different combinations thereof, all of which comprise "search vehicles". It should be further recognized that the beacon detection system may be mounted on a plurality of search vehicles operated simultaneously over a given search region.

Figure 1:
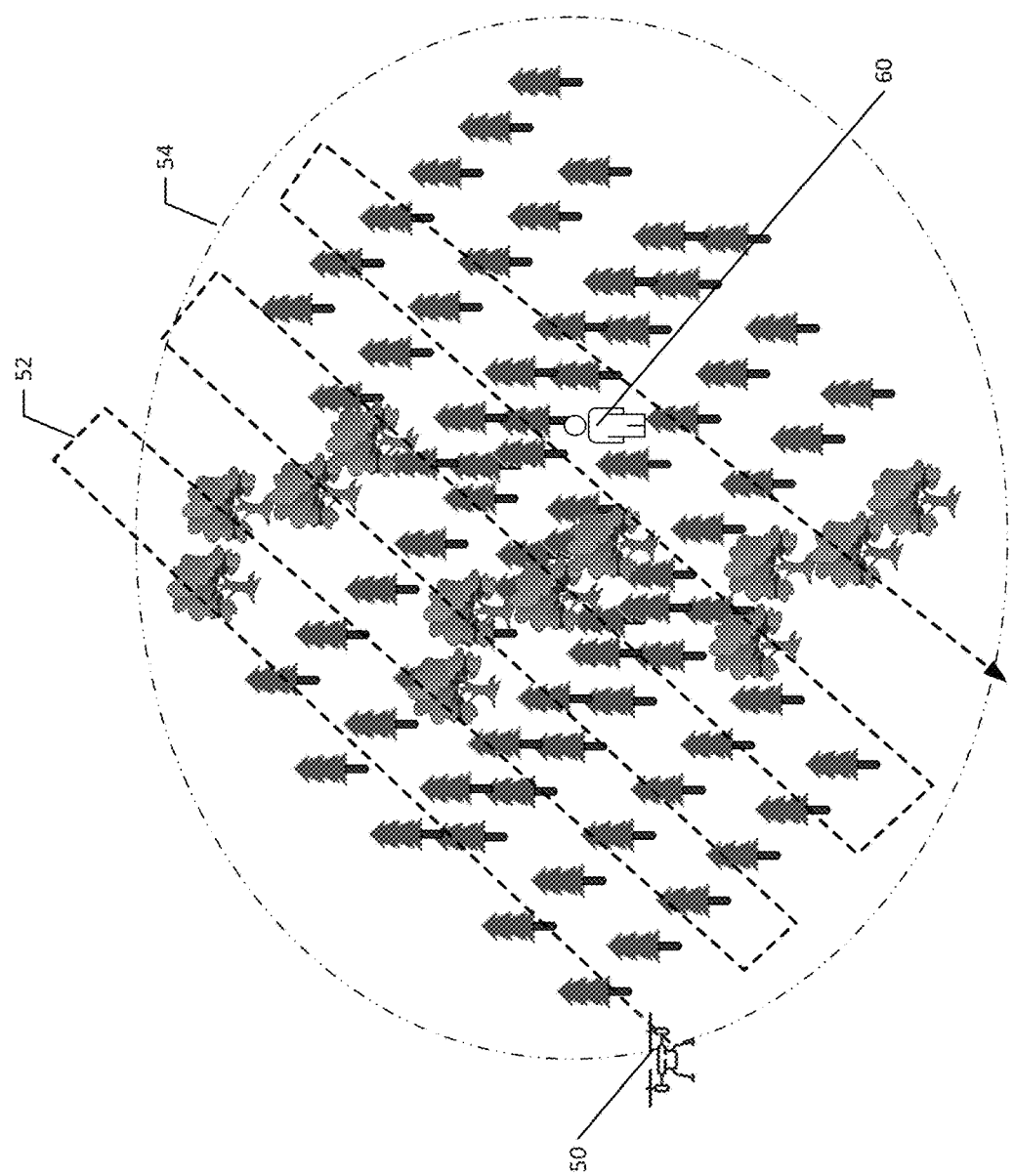
FIG. 1 depicts an overview of a search vehicle flying a search pattern over a portion of a search area.

FIG. 1 illustrates an unmanned aerial vehicle (UAV) (search vehicle) 50 flying a search pattern 52 over a search region or sub region 54. In one context, the vehicle 50 is searching for a beacon associated with a lost search subject 60. In the context of FIG. 1, the unmanned aerial vehicle 50 flies a defined search pattern over a particular search area. The unmanned aerial vehicle 50 includes, as described below, a GPS unit which tracks the position of the UAV 50 in relation to time while the vehicle covers the search pattern. A beacon detector records signal information relative to the position of the vehicle 50 and the search pattern for later analysis to determine the presence of a beacon which may be associated with the search subject 60. It will be understood that the beacon system may be directly connected to the GPS or may match up entries via common clock, and as well that this process may be done in real-time or for later analysis, with the former having the option for real-time communication of results to the operator. It will be understood that the term "search subject" may refer to an individual or multiple individuals.

Although FIG. 1 illustrates one type of search pattern performed by a UAV, in the context of this technology, the search may be conducted by human hikers over terrain in a plotted search pattern, or by manned or unmanned motorized land travel vehicles, or by manned aircraft.

Figure 2:
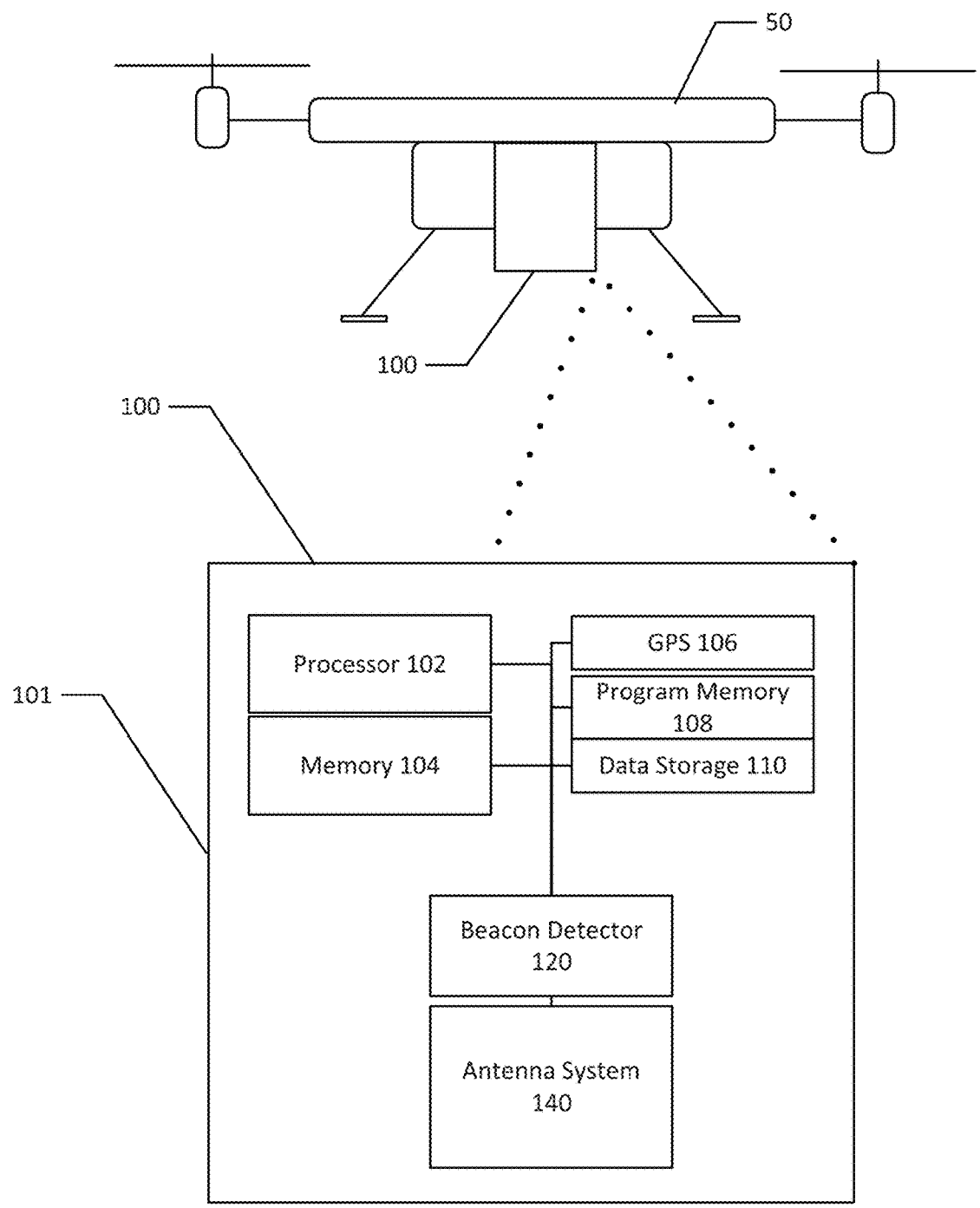
FIG. 2 depicts a first embodiment of a search vehicle and a beacon detection system in accordance with the present technology.

FIG. 2 illustrates a first embodiment of a beacon detection system 100 mounted to an unmanned aerial vehicle 50. In FIGS. 2 through 5, the unmanned aerial vehicle comprises a quad-copter unmanned aerial vehicle, examples of which include DJI Phantom class of drones and 3DR Solo class of drones, although many different types of unmanned air vehicles may be utilized in accordance with the present technology. The beacon detection system 100 is mounted on or constructed to be integrated with the unmanned aerial vehicle 50. The system 100 may be contained in a housing 101 which may be integrated into the vehicle or attached to the vehicle. In one embodiment, the beacon detection system 100 includes a processor capable of executing code to instruct the detection system 100 to perform aspects of the beacon detection technology described herein. The system 100 includes a processor accessible memory 104 which may be utilized by the processor 100 in the context of executing the code including instructions to the processor to perform such functions. Memory 104 is commonly referred to as random access memory (RAM). System 100 further includes a GPS radio 106 which is in operable communication with the processor to provide positioning and timing information associated with detection data as described below. The GPS radio 106 is illustrated as part of the system 100 but in operation may be positioned on an upper surface of the search vehicle to allow the best possible communication between the radio and any GPS satellites. A program memory 108 stores program code executable by the processor 110 and data storage 110 to perform the functions described herein.

In the context of this application, a search agent is an individual or group of individuals coordinating a search over a search area, such a search area 54.

Beacon detection system 100 includes a beacon detector 120 and antenna system 140. Various embodiments of the beacon detector 120 and antenna system 140 are described with respect to FIGS. 3 through 5. In this context, the beacon detector 120 includes electronics and/or processing instructions configured to detect a Wi-Fi connection or connection attempt, or an RFID signal from an RFID tag beacon. Beacon detector 120 is illustrated herein in the context of the aforesaid RF and Wi-Fi embodiments. The examples herein are merely exemplary, and numerous variations of the technology will be apparent to one of average skill in the art.

While the antenna system will be illustrated as a particular antenna configuration, it be understood that many different types of antenna configurations may be utilized in accordance with the present technology. One with average skill in the art will recognize that antenna selection and positioning is important to maximize sensitivity.

In one embodiment, the processor 102, memory 104, program memory 108, and data storage 110 may be implemented by, for example, a Raspberry Pi—a credit card sized, single board computer developed by the Rasberry Pi foundation and commercially available through a number of sources. However, any suitable processor and memory may be utilized, including a custom built processor and memory configuration. It will be understood that the detector system 100 may be integrated into a single board device, a single chip, or may be composed of individual components arranged in any number of suitable physical arrangements to accomplish the task described herein.

Figure 3:
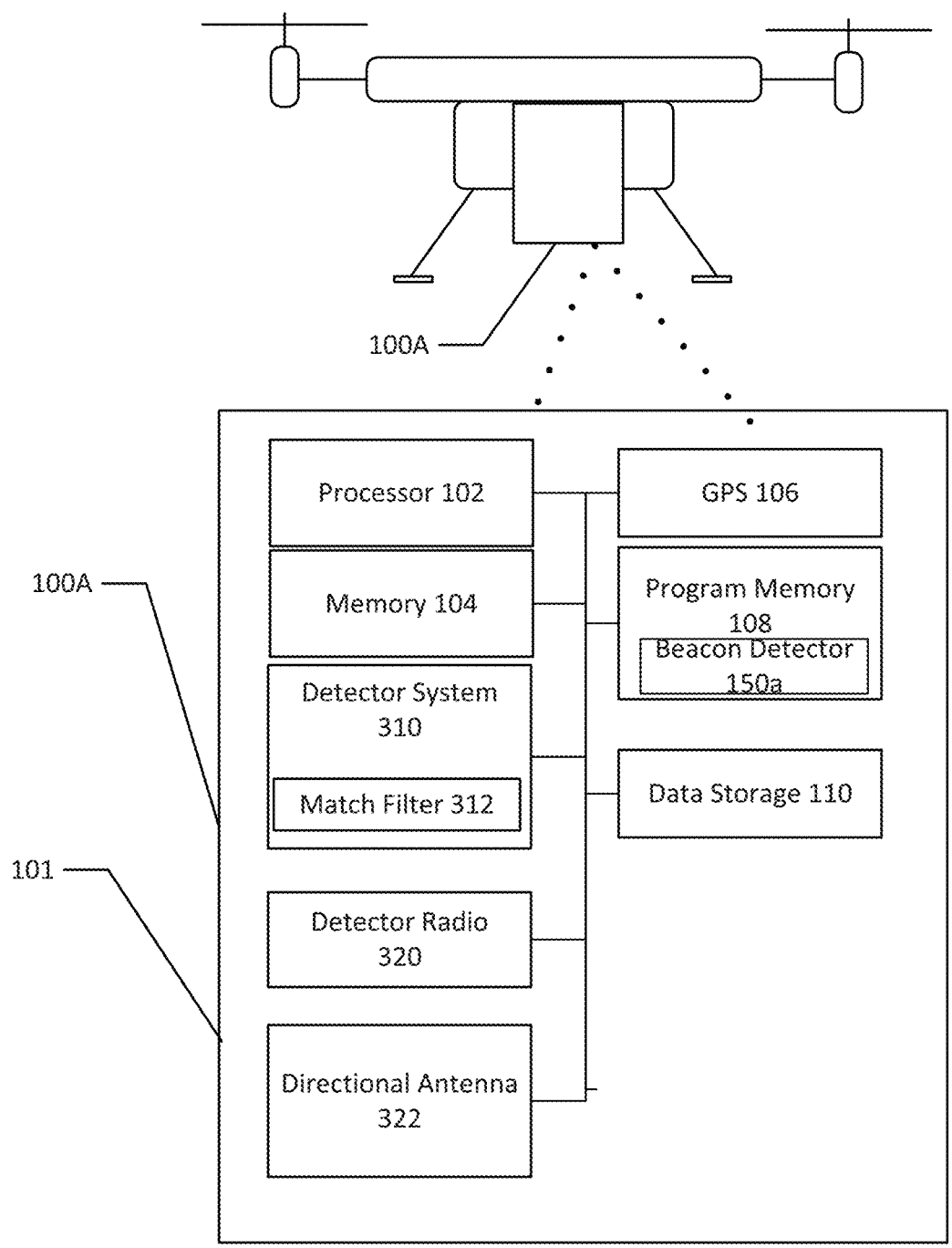
FIG. 3 depicts a second embodiment of a search vehicle and a beacon detection system in accordance with the present technology.
Figure 4:
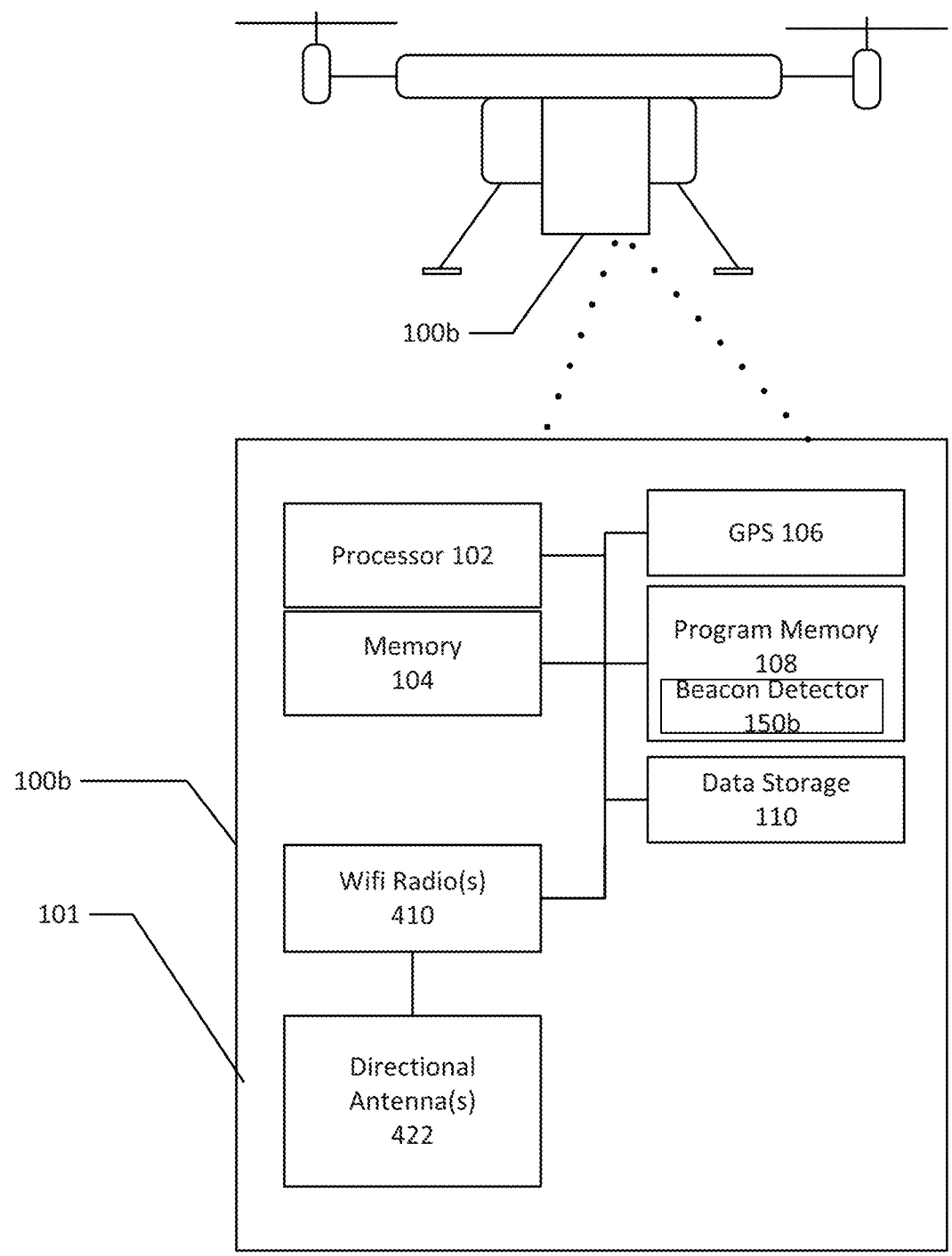
FIG. 4 depicts a $3^{rd}$ embodiment of a search vehicle and a beacon detection system in accordance with the present technology.
Figure 5:
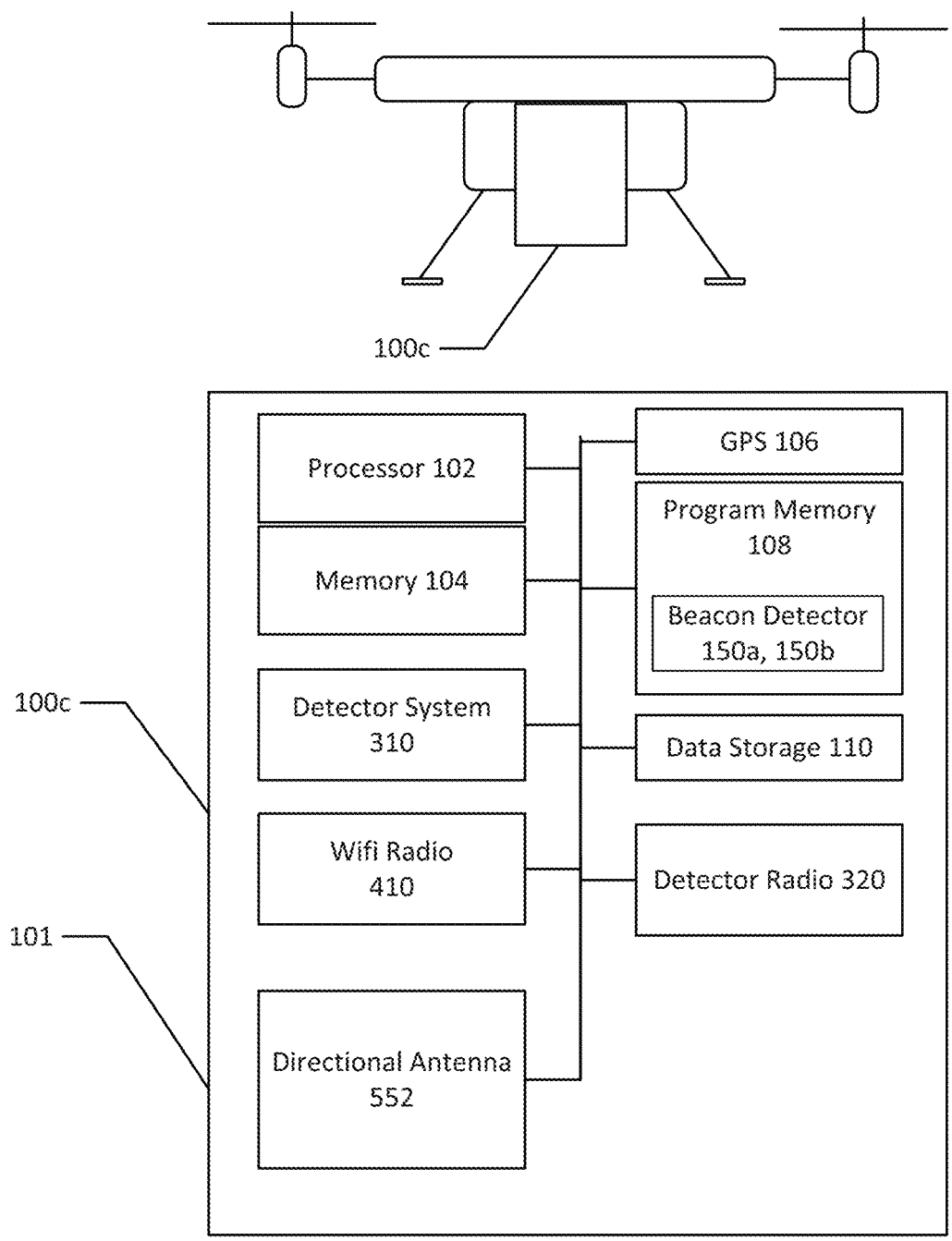
FIG. 5 depicts a $4^{th}$ embodiment of a search vehicle and a beacon detection system in accordance with the present technology.

FIGS. 3 through 5 illustrate various embodiments of the beacon detection system and antenna systems. It should be understood that each of the components having like reference numbers are equivalent components in the respective embodiments.

FIG. 3 illustrates a first embodiment of a beacon detection system 100a, which is designed to search for and detect RFID beacon signals. The RFID beacon signals may be provided by an RFID tag, which is distributed to individuals prior to, for example, the individual venturing into a wilderness area. System 100b includes the processor 102, memory 104, GPS 106, program memory 108, data storage 110 of the first embodiment In FIGS. 3-5 corresponding portions to those of the system 100 of FIG. 2 provided with the same reference numbers as those of the embodiment of FIG. 1, and hence explanations of the corresponding elements are omitted.

Radio-frequency identification (RFID) is a technology uses electromagnetic fields to automatically identify and track signal emitting tags which may be attached to objects. The tags contain electronically stored information. This is important to be able to distinguish the locations of desired individuals from individuals not of interest to the search at hand. Passive tags collect energy from a nearby RFID reader interrogating radio waves. Active tags have a local power source such as a battery and may operate at hundreds of meters from the RFID reader.

In accordance with the technology, the RFID tag searched for by the beacon detection system 100 is generally comprised of an active RFID tag. The RFID tag may take any general shape or configuration, but may, for example, be attached to a piece of clothing or backpack of an individual before the individual ventures out into a wilderness area.

The beacon detection system 100a illustrated in FIG. 3 includes a RFID detector system 310 which may include a match filter 312, a detector radio 320, and directional antenna 322. Directional antenna 322 may be a yagi-uda antenna, moxon, or antenna array, or any other type of suitable directional antenna having an appropriate field of view. As discussed below, the antenna field of view may be utilized to compute a search pattern for the search vehicle 50 in the search region. Detector radio 320 may be a passive reader, which receives radio signals from active tags, or may be an active reader which transmits interrogator signals and receives authentication replies from RFID tags. Detector radio 320 may therefore comprise a broadcast radio and a beacon signal receiver, or just a beacon signal receiver.

RFID systems may operate in the 433 MHz range. Thus, in this example, detector radio 320 is capable of detecting RFID tags in this spectrum and directional antennas 322 are optimized for detection around this frequency. The RFID detector system 310 can be a system capable of discriminating the RFI signal from an RFID tag. In one embodiment, the RFID detector system 310 includes a matched filter 312. The matched filter is utilized in accordance with the present technology to detect identifiable signals from the RFID tag. In one embodiment, the RFID detector system may comprise a software defined radio provided as code executed by processor 110 or as an embedded system used in conjunction with the processor and memory of system 100a. A method for detecting the RFID signals is discussed below.

A beacon detector 150a is provided in program memory 108. The beacon detector is operable to perform the functions described in, for example, the various embodiments of steps 520 and 530 which are associated with detecting RFID signals.

FIG. 4 shows another embodiment of a beacon detection system 100b, which is designed to detect a Wi-Fi signal from a mobile device, such as a mobile cellular phone. One advantage of the system of FIG. 4 is that no active involvement by the missing person or beacon, such as attaching the RFID tag to the person before heading out into the wilderness, is needed. Generally, the proliferation of mobile devices with Wi-Fi capability means that many missing individuals will be already carrying a mobile device with Wi-Fi capabilities. The system of FIG. 4 takes advantage of this using any of a number of different techniques to detect a mobile device within a search area. In one embodiment, the detection system 100b generates an access point with a one or more SSIDs to which a mobile device can connect, and detects a connection or an attempted connection by a mobile device as a beacon which can be associated with a particular individual.

As used herein, a "mobile device" includes any personal device associated with a user including but not limited to a cellular enabled personal device such as a cell phone, a tablet, notebook, or any other general-purpose computing environment which is associated with an individual and which may be carried with the individual. It may also include a device meant to be carried by a person, which implements the Wi-Fi, RFID, or other communications protocol described herein.

Wi-Fi is generally defined as wireless local area network (WLAN) products that are based on the Institute of Electrical and Electronics Engineers' (IEEE) 802.11 standards. Wi-Fi is generically used to refer to the 2.4 GHz 802.11b standard, or any type of network or WLAN product based on any of the 802.11 standards, including 802.11b, 802.11a, dual-band, and so on.

Detection system 100b includes one or more Wi-Fi radios 410, each of which may be coupled one or more directional antennas (or antenna arrays) 422. In an alternative embodiment, only one Wi-Fi radio (such as radio 410) is used. In another embodiment, one Wi-Fi radio is used for broadcasting SSID(s) and another Wi-Fi radio or radios are used to listen for SSIDs. In a further alternative embodiment, multiple Wi-Fi radios are connected to one processing device in order to search for multiple people or cover multiple fields of view or even the same field of view multiple times. In the context of detecting a beacon, Wi-Fi radio 410 acts as a typical Wi-Fi access point, transmitting a SSID (which may be known to the mobile device or unknown to the mobile device) to provide an access point connection to allow the mobile device to connect to the system 100b. In this embodiment, radio 412 monitors for attempted connections to the broadcast SSIDs transmitted by radio(s) 410 and may be utilized by the system 100b to monitor received signal strength and other characteristics of received connection attempts to determine if an attempted connection is made by a mobile device of a search subject. That is, Wi-Fi radio(s) 410 broadcasts one or more SSIDs and acts as a regular connection point for any Wi-Fi radio attempting to make a connection to it. If a connection is made, the system 100b may complete the connection, assign a DHCP address, and attempt to maintain the connection between the beacon (the connecting radio) and the radio 410, or may use information associated with a connection attempt to provide search agents with a location fix on the search subject. In other cases, where a beacon radio cannot connect, Wi-Fi radio 412 monitors connection signals and packets which may or may not make a connection with the first Wi-Fi radio 410 and may determine the signal strength and other characteristics of the connecting signal. In alternative embodiments, the radio 410 may broadcast the SSID but not respond with DHCP, since a single packet from the beacon is all that is required to localize the desired individual. This information may be utilized by the search agent to determine that additional searching in the geographic location where the detection occurred is needed. In this embodiment, the Wi-Fi radios may look for a connection to a specific SSID and the other radio may look for the signal strength of the incoming connection. Each of the Wi-Fi radios 410 may therefore comprise a broadcast radio and a beacon signal receiver, or just a beacon signal receiver.

Multiple directional antennas 422 may be provided. Each directional antenna may be separately coupled to one of the Wi-Fi radios, or may be configured as an antenna array having a known field of view. In this embodiment, the antennas 422 and 424 are optimized to detect signals operable in the 2.4 GHz range to detect Wi-Fi connections from a beacon source. It will be understood that, in some contexts, unidirectional or other antennae will be most appropriate.

A beacon detector 150b is provided in program memory 108. The beacon detector is operable to perform the functions described in, for example, the various embodiments of steps 520 and 530 which are associated with detecting Wi-Fi signals.

FIG. 5 illustrates another embodiment of the detection system 100c. In the embodiment shown in FIG. 5, both an RF detector and a Wi-Fi detector are jointly utilized. One advantage of the system of FIG. 5 is that it can be utilized with either an RFID tag or a Wi-Fi Beacon. Another advantage of the system of FIG. 5 is that the Software Defined Radio (SDR) can be utilized to further analyze Wi-Fi signals which may be detected by the Wi-Fi system. This includes performing a signal analysis similar to that described below which is performed in the RFID embodiment to determine aspects of a Wi-Fi connecting signal which may not be apparent using one or more Wi-Fi radios (eg. radio(s) 410). For example, the RF detector system 310 may be utilized to search for the Wi-Fi frequency (in conjunction with the RF signal) so that in cases where an incomplete Wi-Fi packet or no Wi-Fi packets are actually detected, the Wi-Fi signal can still be detected by the RF detection technology. As illustrated in FIG. 5, system 100c includes the detector system 310 and detector radio 320 of the embodiment of FIG. 3, as well as the Wi-Fi radio(s) 410 from the embodiment of FIG. 4. In an alternate embodiment, multiple SDRs are used to build a custom beamforming Wi-Fi radio.

Multiple beacon detectors 150a and 150b, equivalent to those set forth above, are provided in program memory.

FIG. 6 is a flowchart illustrating one method for implementing the present technology. Each of the methods illustrated in FIGS. 6-11 may be performed by hardware only, or hardware and software (executing for example on processor 102).

FIG. 6 is a flowchart illustrating a method which takes advantage of the present technology to detect beacons which may be associated with a person or entity for which a search is underway. At 510, a survey for a defined area is performed. FIG. 1 illustrates a UAV surveying a defined area or subregion of an area. At 515, signal data associated with locations are acquired during a search performed in the search area. Embodiments for acquiring signal data are discussed below. At 520, the survey data is accessed by a search agent or a processing device to determine whether one or more indicators of a search subject are present. Indicators may include an RF signal detection or a Wi-Fi connection or connection attempt.

FIG. 7 illustrates one embodiment for performing a defined survey at 510. Generally, the survey includes determining a search area 610, defining the search area into search area subregions based on a flight time and the antenna's field of view at 620, and piloting a search vehicle over each of the subregions or multiple search vehicles and parallel over multiple subregions until all subregions search area are complete at 630.

At 610, because each of the antennas has a known field of view for a given flight height of a search vehicle, and each search vehicle generally has a known maximum flight time over the search area (including time to travel to and from the search area to a search agent base of operations), a search agent can, for a given search area, develop known search subregions and flight patterns over the search subregions. Because generally the search area which is required when looking for a missing individual is quite large, a search area will be broken down into several subregions. Following a flight over particular subregion 630, a search vehicle will return to the search agent to be outfitted for another search of a particular subregion. As discussed herein, multiple search vehicles each with a beacon detection system may be operated together to cover the entire search area.

Likewise, multiple search agents in land vehicles or hiking may carry detection systems as described herein to cover a search area on the ground.

Returning to FIG. 6, at 515, signal data is acquired during the survey at 510. Acquiring signal data includes monitoring radio signals in the area for either a Wi-Fi connection attempt, or for particular patterns within a RF signal. Note that particular patterns within a Wi-Fi signal can also be monitored when the system detector 100 is utilizing the RF radio technology. In accordance with the technology, acquisition of signal data at 515 includes acquiring a plurality of samples, (on the order of, hundreds, thousands, or millions of samples per second) with each sample having at least associated signal data, GPS location data, and a timestamp. In this manner, the location of the survey vehicle when it acquired the particular signal data can be determined, and this information utilized to perform further actions on the data.

At 520, the survey data which is acquired at 515 is accessed. Three sub steps 522, 524 and 526 illustrate various embodiments (used alone or in combination) for accessing the data acquired at 515. In one embodiment, survey data acquired at 515 is stored in data storage 110 in each of the different beacon detection systems. In this embodiment, at 522, upon landing after each subregion is surveyed, survey data from the survey is downloaded from the data storage 110 for processing at 530. In another embodiment, survey data can be accessed by the processor 102 executing instructions in program memory 108 to analyze the data in accordance with the analytics discussed below at 526 while the survey is being conducted. This near-real time analysis allows data to be provided to searchers during the search process, and searchers may manipulate the search vehicle to further refine the location of a search subject while the search is in process.

At 530, a determination of a possible sighting of beacon in the survey area is determined. Determining a possible sighting of a beacon is described below with respect to FIGS. 8 and 9, and is dependent upon whether or not the RF embodiment, or the Wi-Fi embodiment, or a combination thereof, is in use. As noted above, the processing of data may occur at the search vehicle during the search process or at a later time. Where processing occurs at the search vehicle during the search process, optionally, at 535, search data may be streamed to a search agent. The data streamed from the beacon detector may be provided to a processing device of a search agent for output in a user interface on the processing device in a search agent application. Finally, at 550, further action on the sighting may be taken. Such further action may be a decision to return the search vehicle to a designated area, send individual searchers on foot into the area, or other similar actions.

In this respect, further action at 550 may include directing the search vehicle to return to the identified location where the signal connection was made in order to acquire additional data, either by manually flying the search vehicle to the area, or using a feedback loop to a flight controller in the vehicle to have a return to the area together data until such time as it can no longer remain aloft and safely return to the search agent.

Figure 8:
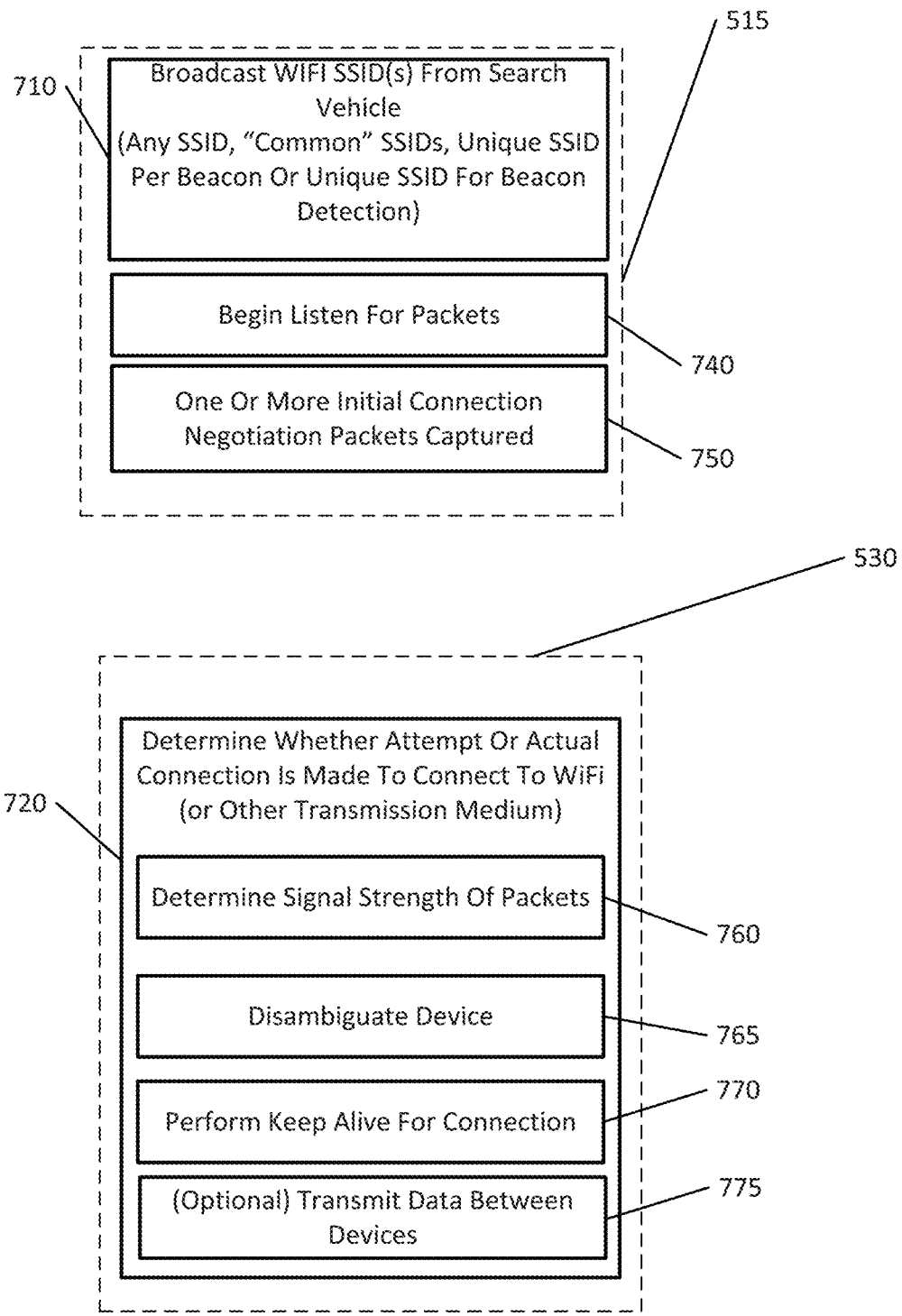
FIG. 8 illustrates a first embodiment of a method for acquiring signal data and determining a possible sighting of a beacon in survey data.
Figure 9:
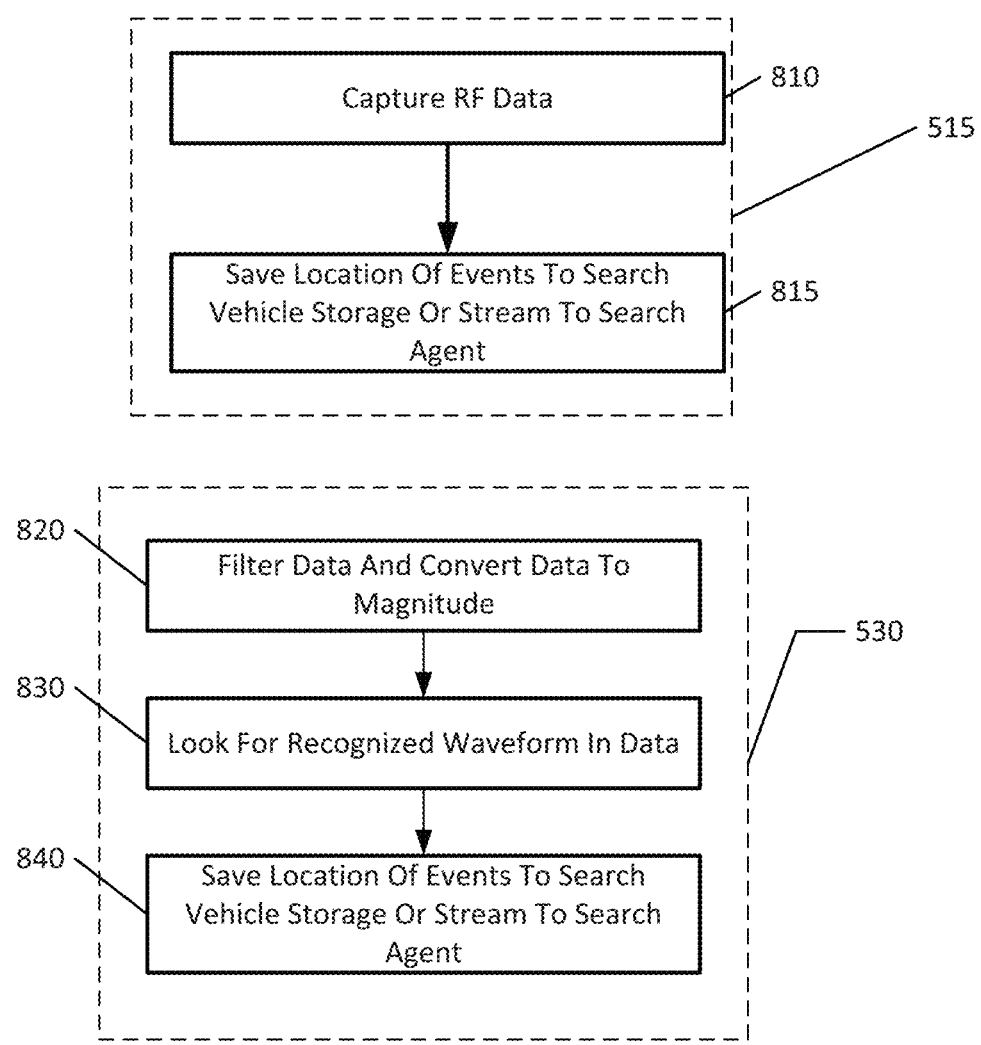
FIG. 9 illustrates a second embodiment of a method for acquiring signal data and determining a possible sighting of a beacon within the survey data

FIGS. 8 and 9 illustrate two embodiments for performing steps 515 and 530 in FIG. 6.

In FIG. 8, detection of a Wi-Fi signal from a mobile device using a system 100 such as that in FIG. 4 or 5 is described. In the context of FIG. 8, and as described below, a mobile device may have a search identifier application installed which may work in conjunction with the detection system 100 to enhance the accuracy of the search process. In other cases, no search identifier application may be installed. A search identifier application is discussed below with respect to FIG. 11. The technology allows for detection of the mobile device of a search subject whether or not the search identifier application is installed.

At 710, one of the broadcast Wi-Fi radios broadcasts one or more Wi-Fi SSIDs from the detection system in the search vehicle. The broadcast SSIDs may be any SSID, a unique SSID for the beacon which is sought, or a unique SSID for the beacon detection system. In one configuration, the user may configure a mobile device to search for a particular SSID for a search system run by a search agent. For example, a hiker may configure a mobile device to search for the SSID "rescue" and configure the device's the Wi-Fi settings to connect to that network whenever it is seen. This "rescue" network is or may be a generic name for the rescue system operated by the system agent. In another embodiment, the mobile device may be configured to connect to a device-specific SSID. This SSID may be, for example, the users name and a hash of the MAC address of the network component of the mobile device. Alternatively, the SSID may be specific to a search agency, a search agent, or the search itself. The SSID may be a combination of the above. The SSID may identifies the search client application commercial provider to the user. In one embodiment, the SSID takes for form [Commercial provider]_[subject name]_ [Random eight digits]. In the latter example, if a search subject were to see the SSID out of context, their first name is a piece of profile information that they would recognize it as personal to them, and the randomness is the best way of ensuring privacy, as a per-user secret key In another configuration, multiple SSIDs which are common commercial SSIDs may be broadcast. For example, commonly used SSIDs of, for example, coffee house or hotel chains to which the mobile device of a search subject is likely to have connected in the past may be broadcast in order to generate an attempt from the mobile device to connect to the common commercial SSID. In some cases, one connection attempt is all that may be necessary for the search agent to gather sufficient information to locate a search subject. In another configuration, a search subject's own personal home or business Wi-Fi SSID may be broadcast as it is likely that a search subject's phone will attempt to connect to their own SSID.

The SSIDs may be broadcast from one or multiple Wi-Fi radios in the embodiment shown in FIG. 4, or FIG. 5.

In a further embodiment of the configurations of FIG. 4, or FIG. 5, the detection system may broadcast a separate administrator SSID allowing search agents to connect to and control the detection system 100 during the search process. Having the separate admin network makes it easier for the searchers to connect and to detect the mobile device of a search subject because target device packets will never connect to the admin SSID. Thus, in certain cases, any attempt to connect to any SSID other than the admin network may be considered data of relevance in finding a search subject.

At 710, in accordance with the foregoing discussion, signal samples are continuously acquired in the search area, along with the location of each event (signal record), the time of each event, and the GPS coordinates of the event. Each event is stored to the search vehicle storage (such as data storage 110) or is streamed to a search agent, or processed by processor 102 and memory 104 in accordance with instructions stored in the program memory.

At 720, a determination is made as to whether a WiFi connection is made or an attempt is made to connect to one or more of the broadcast SSID or SSIDs. Step 720 is one example of performing step 540 in FIG. 6. At 740, each of the Wi-Fi radios will listen for packets. At 750, one or more initial connection negotiation packets of a Wi-Fi connection attempt will be received. If the packet is a complete packet and a connection can be made, one of the Wi-Fi radios will complete the Wi-Fi communication protocol and allow a connection by the beacon to the one or more broadcast SSIDs. The receiving Wi-Fi radio may attempt to measure the signal strength of the connecting beacon and record this data. At 760, signal strength the packets may be determined, and if a connection is made, at 770, the system 100 attempt to keep the connection between the Wi-Fi radio on the search vehicle and the mobile device active. In this respect, this may include, for example, issuing a DHCP address to the mobile device in order to create a network connection between the search vehicle mobile device, or simply pinging the mobile device to attempt to keep the mobile device active to in order to acquire additional data which may help to localize the beacon.

At 765, in various embodiments, one or more techniques for disambiguating a mobile device from other mobile devices may be utilized. In an embodiment, information in connection negotiation packets associated with a Wi-Fi connection or DHCP lease negotiation may be utilized to disambiguate the mobile device of the search subject from other signals which may be received. For example, in a DHCP lease negotiation, a client identifier is typically supplied in the initial lease negotiation. In devices using Apple Corporations iOS, the identifier is typically the name of the device identified in the device settings. This information may be captured by the detector system 100 and utilized to identify the search subject's mobile device.

In another aspect, the mobile device's media access control address (MAC) address. A MAC address is a unique identification number which represents the device in a network. Typically, the first 3 bytes (24 bits) of a MAC address specify an OUI (Organizationally Unique Identifier) which is assigned by the IEEE Registration Authority. Using the unique identification number and the public listing of the IEEE Registration Authority, the system 100 can disambiguate device by manufacturer such that if a search subject's mobile device manufacturer is known, connection attempts made to a detection system identify likely and/or unlikely candidates for the search subject' mobile device. In a further alternative embodiment, MAC addresses are known to be subjects or non-subjects and can be appropriately highlighted or excluded.

FIG. 9 illustrates a second implementation of steps 515 and 530 where an RF embodiment is utilized. At 810, RF data is captured for example by the antenna 322 and detector radio 320, over a series of samples in the search region or sub region. At 815, the location, time, and signal data is stored in search vehicle data storage 110, or streamed to a search agent. Alternatively, as discussed above, the operations of step 530 described herein at 820, 830 and 840 can be performed by the processor 102 in real time by the system 100. At 820, the in-phase and quadrature data is converted to magnitude. The magnitude data is useful in this context in applying the received data to a match filter. The match filter output is analyzed and at 830, a process looks for the area of the square wave (in both positive and negative amplitudes) which matches a particular pattern. This can be the pattern of the RFID tag, or a pattern of a Wi-Fi packet, or only a part of either. In one embodiment, the pattern includes nine associated peaks and valleys (positive and negative amplitudes) which identify the received signal as that of a particular RFID tag which is being sought. Hence, at 830, the system looks for recognized waveforms in the data utilizing the match filter. At 840, the detected wave form and position output to search vehicle storage or the search agent for processing in accordance with step 550.

Figure 10:
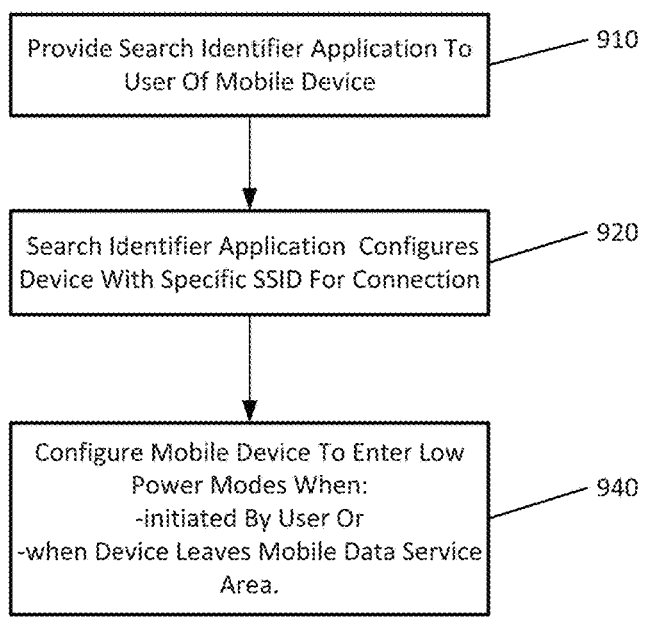
FIG. 10 illustrates a method of providing a search identifier application to a user of a beacon such as a wireless mobile device.

FIG. 10 is a method illustrating one embodiment for configuring a mobile device. In one aspect, discussed above, a user may configure a mobile device to look for a particular SSID of a Wi-Fi network. In another embodiment, illustrated in FIG. 9, a user may be provided with an application which configures multiple aspects of a mobile device. At 910, a search identifier application is provided to the user of the mobile device. The search identifier application may be downloaded utilizing any of a number of known application stores associated with known mobile devices. At 920, the search identifier application operates programmatically to configure the mobile device to look for a specific SSID or connection activity. As noted above, this may include providing a unique SSID for each device, known to the search agent. At 940, the application can operate programmatically to configure the mobile device to enter power saver mode when either specifically initiated by user, or when the device leaves a mobile device service area. Alternatively, it may instruct the user on how to perform these functions themselves. For example, when the mobile device leaves a cellular service area, the device and automatically enter a mode where it becomes detectable by the beacon detection system 100, but conserves power. In such a mode, the device may enter a so-called "airplane" mode, which places all of the services of a particular mobile device in suspension, but the application may likewise enable Wi-Fi to allow the Wi-Fi beacon detection of the present technology to occur.

Figure 11:
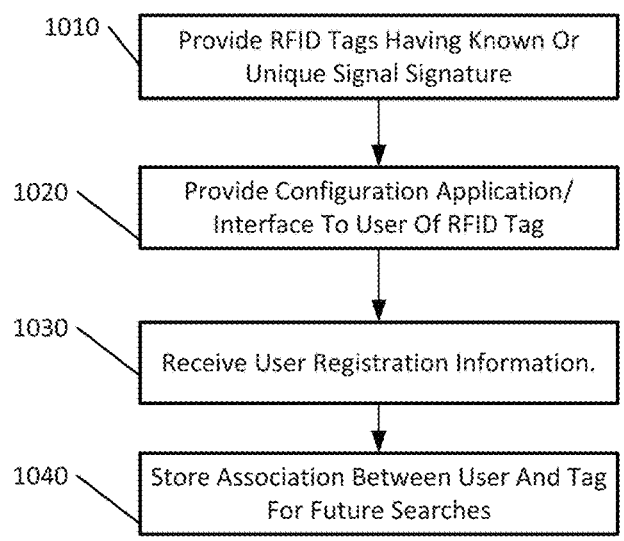
FIG. 11 illustrates an embodiment of the technology utilizing an RFID tag in accordance with the present technology.

FIG. 11 illustrates a method of configuring RFID tags with an association to a user or individual. At 1010, RFID tags having known or unique signal signatures are distributed to users. At 1020, a search identifier application or interface is provided to the user of one such RFID tag. The application may be a mobile device application or provided, for example, via a web-browser, allowing a user to register an RFID tag to a particular user. In this context, RFID tags may be distributed to a user, and the user may be prompted to configure the RFID tag to associate the RFID tag with the user such that if the user embarks on an activity with the possibility of being lost, carrying the RFID tag will provide a unique signature which can be sought by the beacon detection system 100 when searching for the user. This allows the beacon detection system 310 (and match filter 312) to be specifically tuned to the particular RFID signal. At 1030, user registration information can be received by the application or the interface and at 1040, an association between user and the tag can be stored for future reference in future searches. A hybrid of this process could also occur for a Wi-Fi tag which may be hardware independent of cell phone or other general-purpose computing device where the Wi-Fi tag is designed for the specific purpose of being located when lost.

FIG. 12 illustrates components of a mobile device application such as a search identifier application provided in a mobile device 1200. The mobile device application 1240 may be executed by the processor of a mobile device 1200. The application includes a user interface 1242, a user profile transmitter 1244, a SSID connector 1246, and a power manager 1248. The user interface 1242 may include various screens and input/output prompts guiding the user through a configuration process which makes the mobile device easier to detect to the detection system 100. In one embodiment, this can include a registration process whereby a user of the mobile device provides information to the application which identifies the user, certain aspects of the mobile device and user information to be stored in a registered individual database (e.g. a "registry") for use by the detection system when an individual goes missing. This information can include the mobile device type, MAC address and configuration information of the mobile device. The user profile transmitter 1244 allows that the mobile device to provide user-specific registration information to a registry. The SSID connector configures the mobile device to attempt to connect to a specific SSID (examples of which are discussed above) of a detection system which may uniquely identify the search subject. A power manager may be enabled to control or detect and give feedback on various aspects of the mobile device 1200 to conserve battery life in a search situation. Many devices have low-battery power-saving modes. The power manager enhances the ability of the beacon to maintain power and hence respond to searches longer.

FIG. 12 includes a depiction of an example of typical architecture for a mobile device. The mobile device 1200 has memory 1210, processor 1240, an input/output (I/O) controller 1290, a cellular radio channel and WLAN/WMAN data channel 1260, and power controller 1270. Each of these components may connected through a system bus (now shown).

Memory 1210 includes the mobile device's operating system 1212, and one or more applications, including search identifier application 1250 and comprises volatile and non-volatile storage. The operating system 1212 handles the different operations of the mobile device 1200 and may contain user interfaces for operations, such as placing and receiving phone calls, text messaging, checking voicemail, and the like.

The operating system 1212 manages the hardware of the mobile device 1200, including hardware such as the display 1252, speaker 1254, keyboard 1256, and camera 1258. The operating system 1212 also manages software (i.e. applications) on the mobile device 1200 for performing tasks requested by the user and handling incoming data, for example. The power controller 1270 of the mobile device 1200 allocates power from the mobile device's power supply 1272 to the circuitry for different mobile device components used to operate the mobile device 1200 and its different features.

The mobile device 1200 also contains a cellular radio channel and WLAN/WMAN data channel 1260 for receiving and transmitting data, such as phone calls, text messages, email, webpage data, and the like. Cellular radio communication can occur through any of the standard network protocols of mobile device communication (i.e. GSM, PCS, D-AMPS, UMTS, and the like.). The mobile device 1200 may also contain additional communication channels 1262, such as Wi-fi, Bluetooth, and the like, for receiving and transmitting data as well. The mobile device 1200 may have additional functional elements for communication 1264, such as GPS. Each of the described communication mediums is accessed via the antenna 1266 on the mobile device 1200. The communication mediums for operations of the mobile device 1200 are not limited to the mediums described and can include any other communication mediums known in the art.

In a further aspect, multiple-input and multiple-output, or MIMO techniques may be used to provide directional bearing information of a search subject. If the WIFI radios with MIMO functionality are used, such radios may be accessed programmatically. Each detection event provides sufficient information to estimate directional bearing information.

In still other embodiments, the detection system 100 may be provided with an audio and/or visual indicator of the detection of a beacon. For example, a beeper or flashing visual light may indicate to searchers that a detection event has occurred. This would allow searchers on foot to more be made aware of the possible proximity of a search subject without concentrating on an operator's console, which may be separate hardware or software.

Search agents may likewise be provided with a control device, which may be a mobile device such as that illustrated in FIG. 12, which may include an application allowing users to analyze and visualize search data, or invoke such functionality from other applications on the device, in accordance with the discussion herein. For example, the analysis described in FIGS. 8 and 9 may be performed on the device in cases where data is downloaded after a search of a search area is performed or streamed to the search agent's device during the search process. The application may allow for visualization of the search data by plotting detection events on a computer-generated map using GPS coordinate data associated with the event. Multiple detection events may be clustered to provide additional visibility relative to data associated with the event. For example, multiple detection events may be clustered by signal strength in a user interface, allowing a search agent to determine best-likely search areas for search subjects.

When the present technology is embodied by a mobile phone or other computing environment, such computing environments offer capabilities that would be more difficult to offer elsewhere. Messages between victim and searchers can be sent or received during potentially brief connectivity between any two systems, and used to alert the victim they they've been found, instructions on how to treat an injury, or give the searchers detailed status of the victim. With longer or repeated connectivity, a two-way dialogue is possible. This conversation could take the form of text, audio, or even video, and especially given the A/V capabilities of devices on both sides.

In addition to location and communication that can be provided over this unique Wi-Fi link, the presence of an application on a mobile device can be used to provide additional functionality for those leaving or operating on the fringe of cell phone connectivity. Weather reports and alerts, trail maps, safety and first-aid tips, contact info for emergency services, notification of personal emergency contacts in the case of a failure to return or check in on time. This functionality could be made available directly to consumers via a "first party" app or added to third party applications via a software development kit (SDK). The data could be received via cellular networks, fixed special-purpose Wi-Fi networks that either gather the data themselves (e.g. weather) or relay it from another type of link, or peer to peer transmission that takes advantage of the movement and/or connectivity of individuals in the network.

Again because of the great software and hardware capabilities of modern mobile phones, another embodiment involves user phones, rather than specialized hardware, to search for victims. This is advantageous because search and rescue teams would have essentially free access to search equipment or, in a less remote search environment, other users of the system could opt in to automatically and silently becoming part of the search team as they move about the world. The latter has great potential for locating kidnapped children, for instance.

It should be noted that, particularly with Wi-Fi's general use and availability, the ability to be located could be misused, whether to simply violate its users' privacy or worse. A practical scheme to effectively prevent misappropriation of the system is to assign each user a unique Wi-Fi network ID (known as SSID) such that it could not be predicted in advance or brute forced in real-time and cause the phone to respond and give away its presence and location. This unique ID system could be as simple as a keyed hash of the user ID, personal information, or system generated per-user information.

In all embodiments of RF-based technologies, additional embodiments may use direction finding antennae and techniques to augment the information gained from a detection event. This is in addition to an RF receiver system, for example, by using multiple receivers and adding them together with various phase delays. Newer Wi-Fi standards apply similar techniques to form beams and gain sensitivity, range, and bandwidth. The present technology can take advantage of such advances implicitly or perhaps even explicitly with sufficient API access or replication of standard protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the system described could be used to locate a wide variety of targets and in various scenarios, like first responders while they're also looking for the missing victim, fire fighters in brush fires, police serving warrants, wandering elderly, lost children, horses, or dogs.

What is claimed is:

1. A computer implemented method of determining a location of a search subject, comprising:
    accessing search data comprising broadcast Wi-Fi signals and associated geographic location coordinates of a search vehicle travelling in a geographic search area for a search subject, the vehicle carrying a Wi-Fi radio capable of broadcasting one or more SSIDs and receiving connection requests for the one or more SSIDs;
    determining at least a possible connection request from the beacon signals, the connection request associated with a mobile device associated with a search subject; and
    filtering the data to determine whether the connection request is from the mobile device associated with the search subject; and
    outputting search information to a search agent, the search information including a location of at least the connection request, the location based on a position of the search vehicle in the geographic search area.

2. The computer implemented method of claim 1 wherein a search identifier application is provided on the mobile device, and the computer implemented method further includes:
    detecting one or more unique identifiers for the personal device in the search data including one or more of: a MAC address associated with the mobile device; a unique SSID associated with the device; a device identifier associated with a DHCP lease request.

3. The computer implemented method of claim 1 further including receiving a registration of the mobile device from the search subject and storing data associating the mobile device and the search subject in a registry for use in the determining step.

4. The computer implemented method of claim 1 further including associating the MAC address to a manufacturer to present detected signals associated with the mobile device.

* * * * *